(No Model.)

M. FROST.
VEHICLE STEP.

No. 455,194.  Patented June 30, 1891.

WITNESSES:
F. McArdle.
C. Sedgwick

INVENTOR:
M. Frost
BY Munn & Co
ATTORNEYS

UNITED STATES PATENT OFFICE.

MILTON FROST, OF NEW BEDFORD, MASSACHUSETTS.

VEHICLE-STEP.

SPECIFICATION forming part of Letters Patent No. 455,194, dated June 30, 1891.

Application filed November 18, 1890. Serial No. 371,812. (No model.)

*To all whom it may concern:*

Be it known that I, MILTON FROST, of New Bedford, in the county of Bristol and State of Massachusetts, have invented a new and Improved Vehicle-Step, of which the following is a full, clear, and exact description.

The object of the invention is to provide a new and improved vehicle-step which is simple and durable in construction, and insures perfect safety to a person entering or leaving a vehicle by preventing the foot from slipping off the step.

The invention consists of a vehicle-step mounted on a central pivot to permit the step to revolve freely.

The invention also consists in certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
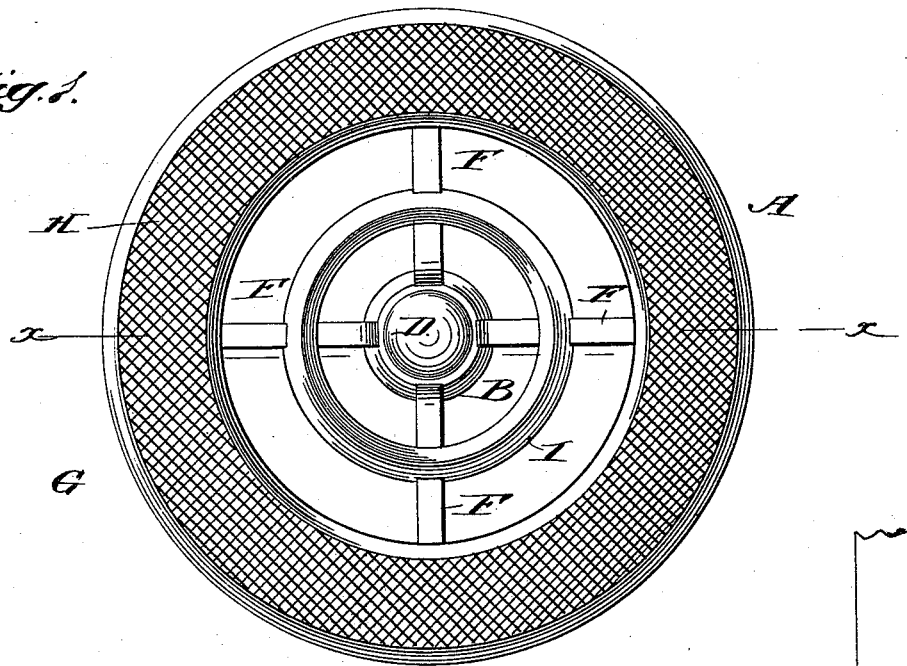
Figure 2:
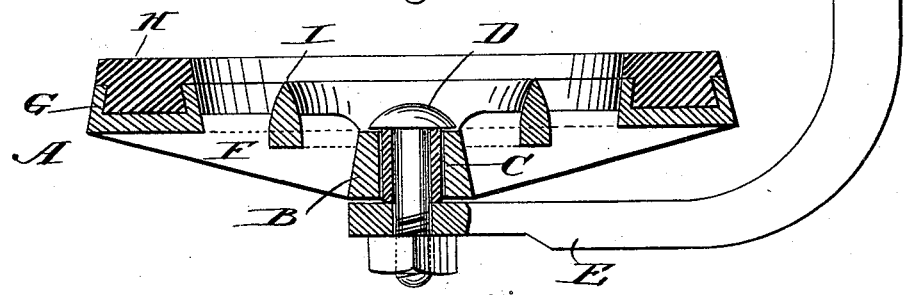
Figure 3:

Figure 1 is a plan view of the improvement. Fig. 2 is a sectional side elevation of the same on the line $x\,x$ of Fig. 1, and Fig. 3 is a sectional side elevation of the washer.

The improved vehicle-step is formed in the shape of a wheel A, provided with a hub B, through which passes loosely a sleeve C, slightly longer than the hub is thick. The sleeve C is fastened by a bolt D to the shank E, attached to the vehicle in the usual manner, the hub being retained loosely on the sleeve by the head of the bolt. From the hub V extend the spokes F, supporting a rim G, provided on its top side with a dovetail groove, into which fits a corresponding dovetail, which is part of a rubber ring H, projecting above the top side and roughened, as is plainly indicated in Fig. 1, to prevent the foot from slipping off. Instead of fastening the ring H by a dovetail and groove to the rim G of the wheel A, other suitable means may be employed—for instance, cement, &c. On the spokes F, within the rim G, is secured a second ring I, preferably arranged concentric with the rim G and having its top sharpened, as plainly indicated in Fig. 2, so as to form a scraper on top of the wheel.

In case the step is to be applied on a shank having the ordinary fixed step a washer J is provided having a groove in its top, which is adapted to fit the usual rib on the under side of the shank. The under side of the nut J then stands at right angles to the axis of the bolt D to permit the nut of the latter to screw squarely against the under side of the washer J. This would not be the case if the washer J were not employed, as the nut would then abut directly against the rib on the under side of the shank.

It will be seen that by forming a vehicle-step in the manner described a person entering or leaving the vehicle and stepping on the said step is prevented from slipping off, as the wheel A turns with the motion of the foot, which necessarily takes place when the person gets into or out of the vehicle. It will further be seen that ice, snow, dirt, &c., on the sole of the person's foot when stepping on the step is easily scraped off by coming in contact with the sharp top edge of the ring I. Sufficient open space is formed between the rubber ring H, the spokes F, the ring I, and the hub B, so that the snow, ice, dirt, &c., can readily fall through the open space to the ground, so that the step remains clean at all times.

Having thus described my invention, I claim as new and desire to secure by Letters Patent—

1. A vehicle-step mounted on a central pivot to permit the step to revolve freely, substantially as described.

2. A vehicle-step comprising a wheel mounted to turn freely on its axis, and a rubber ring secured to the upper side of the rim of the said wheel, substantially as shown and described.

3. A vehicle-step comprising a sleeve adapted to be secured to the shank supporting the step, a wheel mounted to turn on the said sleeve, and a rubber ring secured to the upper side of the rim of the said wheel, substantially as shown and described.

4. An open revoluble vehicle-step provided with a sharpened scraper, substantially as shown and described.

5. A vehicle-step comprising a wheel mounted to turn and having an open web, and a scraper made in the shape of a ring arranged concentric with the rim of the said wheel and held in the said open web, substantially as shown and described.

MILTON FROST.

Witnesses:
 THEO. C. HATCH,
 LEWIS C. SMALL.